United States Patent [19]
Devereux

[11] Patent Number: 6,058,439
[45] Date of Patent: May 2, 2000

[54] ASYNCHRONOUS FIRST-IN-FIRST-OUT BUFFER CIRCUIT BURST MODE CONTROL

[75] Inventor: Ian Victor Devereux, Cherry Hinton, United Kingdom

[73] Assignee: Arm Limited, Cambridge, United Kingdom

[21] Appl. No.: 08/828,501

[22] Filed: Mar. 31, 1997

[51] Int. Cl.⁷ .................................................. G06F 13/00
[52] U.S. Cl. .............................. 710/52; 710/35; 710/53
[58] Field of Search .................................... 395/821, 824, 395/840, 841, 845, 855, 872, 873, 877; 710/1, 4, 20, 21, 25, 35, 52, 53, 57

[56] References Cited

U.S. PATENT DOCUMENTS

| | | | |
|---|---|---|---|
| 4,138,732 | 2/1979 | Suzuki et al. | 364/900 |
| 4,145,755 | 3/1979 | Suzuki et al. | 364/900 |
| 5,469,398 | 11/1995 | Scott et al. | 365/221 |
| 5,471,638 | 11/1995 | Keeley | 395/800 |
| 5,499,384 | 3/1996 | Lentz et al. | 395/821 |
| 5,564,027 | 10/1996 | Bui et al. | 395/309 |
| 5,600,815 | 2/1997 | Lin et al. | 395/436 |
| 5,745,732 | 4/1998 | Cherukuri et al. | 395/495 |
| 5,761,533 | 6/1998 | Alderguia et al. | 395/84 |
| 5,860,119 | 1/1999 | Dockser | 711/156 |

*Primary Examiner*—Ayaz R. Sheikh
*Assistant Examiner*—Tim Vo
*Attorney, Agent, or Firm*—Nixon & Vanderhye P.C.

[57] ABSTRACT

A data processing system comprising a first circuit block 6 and a second circuit block 8 linked via an asynchronous first-in-first-out buffer circuit 12 is provided with a burst marker that identifies the first word in a burst transfer or an empty stage. The second circuit block 8 uses the burst marker to identify the last data word in a burst as being that word which immediately precedes such a burst marker.

11 Claims, 3 Drawing Sheets

Fig. 2A

| burst_start or empty | data | full |
|---|---|---|
| 1 | 00000000 | 0 |
| 1 | 00000000 | 0 |
| 1 | 00000000 | 0 |
| 1 | 00000000 | 0 |
| 1 | 00000000 | 0 |
| 1 | 00000000 | 0 |

| burst_start or empty | data | full |
|---|---|---|
| 1 | 00000000 | 0 |
| 1 | 00000000 | 0 |
| 0 | 10101010 | 1 |
| 0 | 11010011 | 1 |
| 0 | 00110111 | 1 |
| 1 | 00001110 | 1 |

Fig. 2C

| burst_start or empty | data | full |
|---|---|---|
| 1 | 00000000 | 0 |
| 1 | 00000000 | 0 |
| 1 | 00000000 | 0 |
| 1 | 00000000 | 0 |
| 1 | 00000000 | 0 |
| 0 | 10101010 | 1 |

Fig. 2D

| burst_start or empty | data | full |
|---|---|---|
| 1 | 00000000 | 0 |
| 1 | 00000000 | 0 |
| 1 | 00000000 | 0 |
| 0 | 00000000 | 1 |
| 1 | 11100101 | 1 |
| 0 | 10101010 | 1 |

28

ASYNCHRONOUS FIRST-IN-FIRST-OUT BUFFER CIRCUIT BURST MODE CONTROL

BACKGROUND OF THE INVENTION

1. Field of the Invention

This invention relates to data processing systems. More particularly, this invention relates to data processing systems using asynchronous first-in-first-out (FIFO) buffer circuit for passing data words between a first circuit block and a second circuit block operating with different clock signals that have no fixed phase relationship.

2. Description of the Prior Art

It is known to provide asynchronous FIFOs within a clocked system to communicate between two different clocking domains. In this way, it is possible for the circuits within the two domains to interact and yet the needs for clock synchronisation can be eased.

It is also known for different parts of a data processing system to exchange data words in what is termed a burst mode of operation. An example of a burst mode of operation is where a given transfer starts with the destination address followed by a sequence of words that are to be written in sequentially ascending address locations starting from the address specified. (The address and data may be passed via a common FIFO or may each have their own FIFO.) This burst mode is more efficient in terms of bandwidth and power consumption than separately transmitting the address of each word of data to be written when these are following an entirely predictable sequentially increasing address order.

It is also desirable to use a burst mode of operation when communicating using an asynchronous FIFO so as to reduce any synchronisation penalty when reading words from the FIFO. In order for a second circuit block to determine if the FIFO contains a data word it must first synchronise to the second block clock domain the signal from the last stage of the FIFO that indicates whether or not it contains a data word. If a burst mode is not available, then this penalty must be incurred on every read. If a burst mode of operation is provided, then the first word in a burst will incur this penalty, but subsequent words in the burst can be read without any clock synchronisation penalty as long as the last word in a burst can be identified. One way for this mechanism to work is that subsequent words should be available at the bottom of the FIFO once the preceding word has been read. This may be achieved by using a reading clock frequency that is less than or equal to the writing clock frequency and for the words in a burst to be inserted into the FIFO on consecutive clock cycles.

As the operational speeds of data processing systems have increased, it has become desirable to write data words into a FIFO buffer circuit disposed between clock domains at the highest possible rate. When operating at such high rates, a data word within a burst mode of transfer may need to be written into the FIFO buffer circuit before the originating circuit has determined whether or not that data word will be the last word of that particular burst. This imposes a potential constraint on the increase in speed of operation of the system since the circuit that will read the words out from the FIFO buffer circuit needs to be able to identify the last word in a burst.

It is an object of the present invention to provide data processing systems using an asynchronous FIFO buffer circuit between different clocked domains that is able to operate at high speeds by addressing the above mentioned problems.

SUMMARY OF THE INVENTION

Viewed from one aspect the present invention provides apparatus for data processing comprising:

(i) a first circuit block operating under control of a first clock signal at a first clock frequency;

(ii) an asynchronous first-in-first-out buffer circuit coupled to said first circuit block for receiving data words from said first circuit block, said asynchronous first-in-first-out buffer circuit comprising a plurality of buffer stages; and (iii) a second circuit block operating under control of a second clock signal at a second clock frequency and coupled to said first-in-first-out buffer circuit for receiving data words from said first-in-first-out buffer circuit, said second clock signal having no fixed phase relationship with said first clock signal and said second clock frequency being equal to or less than said first clock frequency; wherein (iv) said first circuit block loads data words into said asynchronous first-in-first-out buffer circuit in a burst mode in which a data word is loaded into said asynchronous first-in-first-out buffer circuit with each cycle of said first clock signal without a determination always being available as to whether said data word is a last data word in a burst;

(v) said first circuit block loads a burst marker into said asynchronous first-in-first-out buffer circuit with each data word, said burst marker having a first value when accompanying one of a first data word in a burst of data words or an empty buffer stage and said burst marker having a second value when accompanying a second or subsequent data word in a burst of data words; and (vi) said second circuit block is responsive to said burst markers to identify an end of a burst of data words.

The invention recognises that whilst the first circuit block that is originating the data words being written into the FIFO may not be able to identify in due time whether or not they are the last word in a burst, this information is not actually required until the words emerge from the FIFO buffer circuit into the second circuit block and so it is possible for the second circuit block to identify the last word in a burst using different parameters. More particularly, if the words in the FIFO buffer circuit are marked as the first word in a burst or an empty stage (i.e. a buffer stage whose contents are not significant and may, for example, be all zeros), then a data word of a burst preceding either of these two will be the last word in its burst. The determination that a word being written into the FIFO buffer circuit is the first word in a burst or that a stage is empty is much easier and faster to determine and so can be readily written to accompany its appropriate word/stage along the FIFO and so avoid the potential constraint on system speed.

In preferred embodiments of the invention a full marker is associated with each buffer stage, said full marker having a first value when a buffer stage is full and a second value when said buffer stage is empty.

The full marker may be used to control the passing of data words along the FIFO such that data words 'ripple' through to the buffer stage that is unoccupied and closest to the output. The full marker may also, if required, be sampled by the second circuit block to determine whether or not the buffer stage at the output end of the FIFO contains a data word to be read.

In preferred embodiments a data word is stored into a buffer stage closest to an output end of said first-in-first-out buffer circuit that is empty.

Such a FIFO buffer circuit operates in an essentially transparent manner whereby data words loaded into the buffer circuit propagate along the FIFO circuit until they arrive at the buffer stage nearest the output that is unoccupied. Such operation simplifies matters when the writing into the FIFO buffer circuit and the reading out from the FIFO buffer circuit are conducted by asynchronous circuit blocks operating in different clocking domains. The transparent operation of the FIFO buffer circuit makes it essentially independent of the clock signals of the circuit blocks to which it is coupled.

In order to improve the glitch resistance and ease the set up time requirements of the second circuit block, preferred embodiments are such that said second circuit block reads a burst marker from a buffer stage immediately preceding a buffer stage at an output end of said first-in-first-out buffer circuit. The burst marker may be sampled as the data word at the output end of the FIFO is acknowledged as having been read by the second circuit block. The second circuit block can then directly use this sampled signal to determine if there is now a consecutive word at the bottom of the FIFO.

Whilst the asynchronous FIFO buffer circuit of the present invention may be used between many different sorts of circuit blocks operating with different clocking domains, the invention is particularly suited for applications in which the FIFO buffer circuit is a write buffer disposed between a central processing unit and a memory circuit. A memory circuit will often operate in a different and slower clocking domain than a high speed central processing unit to which it is coupled and a write buffer may be used to ease the synchronisation problems as well as avoiding stalling of the central processing unit whilst the slower memory circuit responds to data being written to it.

Viewed from another aspect this invention provides a method of data processing comprising the steps of:

(i) operating a first circuit block under control of a first clock signal at a first clock frequency;

(ii) receiving data words from said first circuit block with an asynchronous first-in-first-out buffer circuit coupled to said first circuit block, said asynchronous first-in-first-out buffer circuit comprising a plurality of buffer stages; and (iii) operating a second circuit block under control of a second clock signal at a second clock frequency and coupled to said first-in-first-out buffer circuit for receiving data words from said first-in-first-out buffer circuit, said second clock signal having no fixed phase relationship with said first clock signal and said second clock frequency being equal to or less than said first clock frequency; wherein (iv) data words are loaded into said asynchronous first-in-first-out buffer circuit in a burst mode in which a data word is loaded into said asynchronous first-in-first-out buffer circuit with each cycle of said first clock signal without a determination always being available as to whether said data word is a last data word in a burst;

(v) a burst marker is loaded into said asynchronous first-in-first-out buffer circuit with each data word, said burst marker having a first value when accompanying one of a first data word in a burst of data words or an empty buffer stage and said burst marker having a second value when accompanying a second or subsequent data word in a burst of data words; and (vi) an end of a burst of data words is identified in response to said burst markers.

The above, and other objects, features and advantages of this invention will be apparent from the following detailed description of an illustrative embodiment which is to be read in connection with the accompanying drawings.

BRIEF DESCRIPTION OF THE DRAWINGS

FIGS. 2A, 2B, 2C and 2D illustrate example contents of the FIFO of FIG. 1 in different operational states.

DESCRIPTION OF THE PREFERRED EMBODIMENTS

Figure 1:
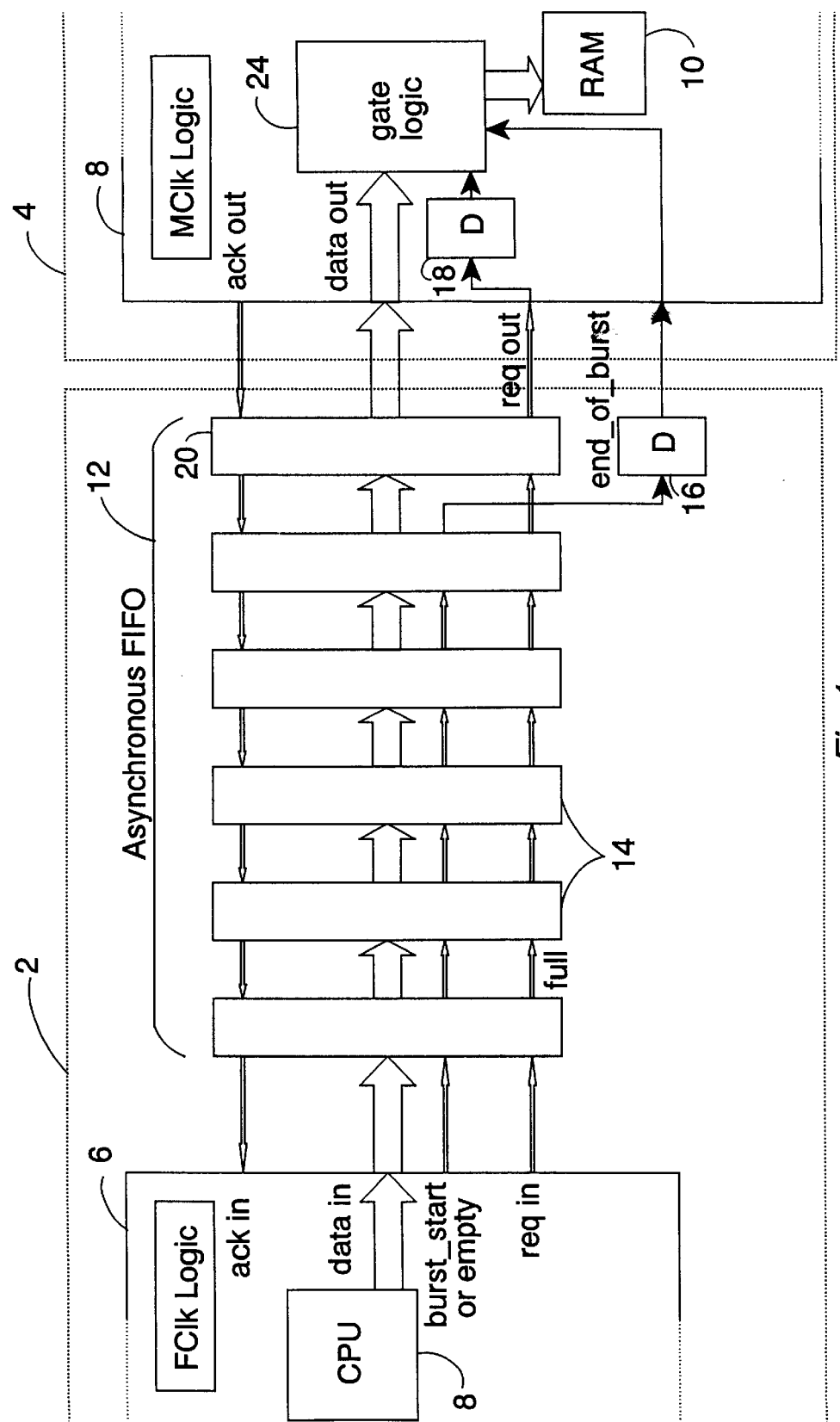
FIG. 1 schematically illustrates a central processing unit communicating with a memory circuit via an asynchronous FIFO write buffer.

FIG. 1 shows a first integrated circuit 2 and a second integrated circuit 4. The circuit elements shown in FIG. 1 as a first integrated circuit 2 and a second integrated circuit 4 may also be formed as part of a single integrated circuit (e.g. an ASIC) that for some reason uses different clocking domains. The first integrated circuit 2 includes first circuit block 6 that itself incorporates a central processing unit 8. The second integrated circuit 4 includes a second circuit block 8 that itself incorporates a memory circuit (random access memory) 10. Between the central processing unit 8 and the memory circuit 10 there is disposed an asynchronous FIFO 12 serving as a write buffer. The write buffer 12 incorporates six buffer stages 14 that are each capable of storing a word. Each word may comprise the start address of a burst transfer, a data word to be written into memory and addresses starting at and incrementing from the specified address or may be an empty stage marked by a full marker. At each end of the write buffer 12, respective request and acknowledgement signals confirm that a word has been properly written into or read out from the write buffer 12.

The central processing unit 8 also serves to provide a marker bits within the words written into the write buffer 12. This is a burst marker (burst_start or empty). In addition, each stage within the write buffer contains a full marker that indicates whether or not it contains a data word. The full marker takes the form of a request signal (req) that is passed between buffer stages together with an acknowledge signal (ack) to provide handshaking between buffer stages that controls movement down the write buffer 12 of data words. The burst marker and full marker propagate along the write buffer 12 in synchronism with the associated word in the buffer stage 14. Burst marker is set to a "1" when the CPU initiates a burst transfer as well as when the CPU is not writing to the write buffer 12. The full bit is set to "1" when a data word held within a buffer stage, i.e. marked as not empty.

At the output end of the write buffer 12, the immediately preceding buffer stage from the final buffer stage 20 supplies its burst marker to burst latch 16 whilst the full marker from the final buffer stage 20 is supplied to full latch 18. The burst latch is written at the same time that the corresponding word is transferred into the final output buffer stage 20.

The outputs from the latches 16, 18 are supplied to gate logic 24 to indicate when reading from the write buffer 12 should be stopped, i.e. the end of a burst and no further bursts. The gate logic 24 also uses these signal to identify the first data word in a burst so that this may be treated as an address rather than as data.

FIG. 2A illustrates the contents of the write buffer 12 when it is completely empty. The lowest row in FIG. 2A is the final output stage 20 of the write buffer 12. The latches within each buffer stage that hold the burst markers are transparent when that stage is full and so a "1" value will propagate to the output end of the write buffer 12 even though none of the intervening buffer stages are storing data words or passing data words along the write buffer 12.

FIG. 2B illustrates the contents of the write buffer 12 when a four word burst transfer has been stored therein. The first word is marked with a burst marker having a value "1" whereas the following three words are all marked with a burst marker of "0". The final two stages that are empty are marked with a burst marker of "0". The first four words in the write buffer 12 have a full marker of "1" indicating that they are full stages.

FIG. 2C indicates the situation when the first three of the words of FIG. 2B have been read by the second circuit block 8 and only the final data word is present in the output stage 20. At the input end of the write buffer 12 the buffer stages have not been written to and so are empty as indicated by the full marker values "0".

FIG. 2D illustrates an alternative way in which the write buffer 12 may move on from FIG. 2B. In this case, the first burst transfer is followed by a second burst transfer comprising two words 28. These words move ('ripple' using request signal (req) and acknowledge signal (ack) handshakes) along through the write buffer 12 to find the buffer stage nearest the output that is not occupied and then are latched in place there until the second circuit block 8 is able to read them out. It will be seen that the data word of the burst words 28 in fact comprises a data value of "00000000" that is the same as an empty stage value but in this case it will noted that the full marker has a value of "1" rather than "0".

In summary, the first circuit block 6 writes a burst marker into the write buffer 12 at its input end and this marker is used by the second circuit block 8 at the output end to identify the last word in a burst rather than relying upon a marker written at the same time as that last word was itself written into the write buffer 12.

Figure 3:
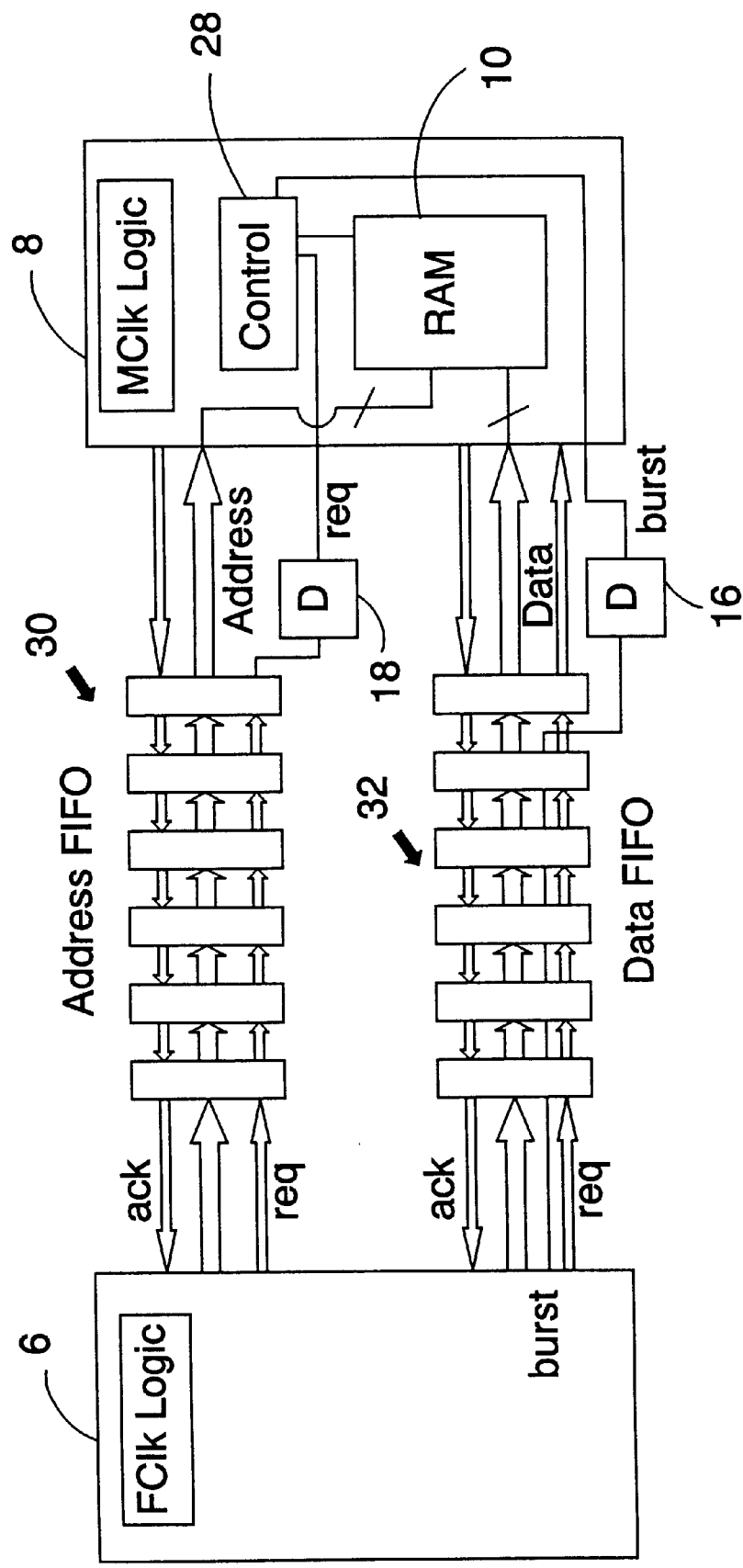
FIG. 3 schematically illustrates a modified system using separate asynchronous FIFOs for data and addresses.

FIG. 3 illustrates a second embodiment using separate FIFOs for the addresses and the data. The first circuit block 6 writes the start address of a burst transfer into the input stage of a address FIFO 30. The data for that burst is loaded on subsequent clock cycles into a data FIFO 32. The first data word in a burst loaded into the data FIFO 32 is marked with a burst flag of "1". Empty data FIFO buffer stages are also marked with a burst flag of "1". The burst flag for the penultimate buffer stage of the data FIFO 32 is read with a burst latch 16 as for the FIG. 1 system. The full marker (request signal (req)) for output end stage of the address buffer is also read by a full latch 18. The burst marker is fed to a control circuit 28 that uses it to identify the end of a burst and so stop the reading of that burst from the data FIFO into the memory 10. The full marker from the address FIFO 30 is also fed to the control circuit 28 where it is used to start the read of the address and then data of any following bursts.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for data processing comprising:
   (i) a first circuit block operating under control of a first clock signal at a first clock frequency;
   (ii) an asynchronous first-in-first-out buffer circuit coupled to said first circuit block for receiving data words from said first circuit block, said asynchronous first-in-first-out buffer circuit comprising a plurality of buffer stages; and
   (iii) a second circuit block operating under control of a second clock signal at a second clock frequency and coupled to said first-in-first-out buffer circuit for receiving data words from said first-in-first-out buffer circuit, said second clock signal having no fixed phase relationship with said first clock signal and said second clock frequency being equal to or less than said first clock frequency; wherein
   (iv) said first circuit block loads data words into said asynchronous first-in-first-out buffer circuit in a burst mode in which a data word is loaded into said asynchronous first-in-first-out buffer circuit with each cycle of said first clock signal without a determination always being available as to whether said data word is a last data word in a burst;
   (v) said first circuit block loads a burst marker into said asynchronous first-in-first-out buffer circuit with each data word, said burst marker having a first value when accompanying one of a first data word in a burst of data words or an empty buffer stage and said burst marker having a second value when accompanying a second or subsequent data word in a burst of data words; and
   (vi) said second circuit block is responsive to said burst markers to identify an end of a burst of data words.

2. Apparatus as claimed in claim 1, wherein a full marker is associated with each buffer stage, said full marker having a first value when a buffer stage is full and a second value when said buffer stage is empty.

3. Apparatus as claimed in claim 2, wherein said second circuit block is responsive to said burst markers to stop loading data words when, for a word at an output end of said first-in-first-out buffer circuit, a burst marker indicates an end of a burst of data words.

4. Apparatus as claimed in claim 1, wherein a data word is stored into a buffer stage closest to an output end of said first-in-first-out buffer circuit that is empty.

5. Apparatus as claimed in claim 1, wherein said second circuit block reads a burst marker from a buffer stage immediately preceding a buffer stage at an output end of said first-in-first-out buffer circuit.

6. Apparatus as claimed in claim 1, wherein said first circuit block comprises a central processing unit, said first-in-first-out buffer circuit comprises a write buffer and said central processing unit and said write buffer operate within a first clock domain.

7. Apparatus as claimed in claim 6, wherein said first clock domain comprises a first integrated circuit.

8. Apparatus as claimed in claim 6, wherein said second circuit block comprises a memory circuit and said memory circuit operates within a second clock domain.

9. Apparatus as claimed in claim 8, wherein said second clock domain comprises a second integrated circuit.

10. Apparatus as claimed in claim 8, wherein a first asynchronous first-in-first-out buffer passes addresses from said central processing unit to said memory and a second asynchronous first-in-first-out buffer passes data from said central processing unit to said memory.

11. A method of data processing comprising the steps of:
   (i) operating a first circuit block under control of a first clock signal at a first clock frequency;
   (ii) receiving data words from said first circuit block with an asynchronous first-in-first-out buffer circuit coupled to said first circuit block, said asynchronous first-in-first-out buffer circuit comprising a plurality of buffer stages; and (iii) operating a second circuit block under control of a second clock signal at a second clock frequency and coupled to said first-in-first-out buffer circuit for receiving data words from said first-in-first-out buffer circuit, said second clock signal having no fixed phase relationship with said first clock signal and said second clock frequency being equal to or less than said first clock frequency; wherein (iv) data words are loaded into said asynchronous first-in-first-out buffer circuit in a burst mode in which a data word is loaded into said asynchronous first-in-first-out buffer circuit with each cycle of said first clock signal without a determination always being available as to whether said data word is a last data word in a burst;

(v) a burst marker is loaded into said asynchronous first-in-first-out buffer circuit with each data word, said burst marker having a first value when accompanying one of a first data word in a burst of data words or an empty buffer stage and said burst marker having a second value when accompanying a second or subsequent data word in a burst of data words; and (vi) an end of a burst of data words is identified in response to said burst markers.

* * * * *